United States Patent
Hawkins et al.

(10) Patent No.: US 7,081,270 B2
(45) Date of Patent: Jul. 25, 2006

(54) METHOD OF CHEMICAL SOIL STABILIZATION AND DUST CONTROL

(75) Inventors: Todd R. Hawkins, Massillon, OH (US); Leland E. Beyersdorff, North Canton, OH (US); Robert W. Vitale, Canton, OH (US)

(73) Assignee: Midwest Industrial Supply, Inc., Canton, OH (US)

( * ) Notice: Subject to any disclaimer, the term of this patent is extended or adjusted under 35 U.S.C. 154(b) by 0 days.

(21) Appl. No.: 10/870,658

(22) Filed: Jun. 17, 2004

(65) Prior Publication Data

US 2004/0234682 A1 Nov. 25, 2004

Related U.S. Application Data

(63) Continuation of application No. 09/896,456, filed on Jun. 29, 2001, now abandoned, which is a continuation-in-part of application No. 09/606,497, filed on Jun. 29, 2000, now abandoned.

(51) Int. Cl.
*B05C 1/16* (2006.01)
*B05D 1/02* (2006.01)

(52) U.S. Cl. ...................... 427/136; 427/421
(58) Field of Classification Search ............... 427/136, 427/212, 215, 220, 221, 421, 138
See application file for complete search history.

(56) References Cited

U.S. PATENT DOCUMENTS

| 2,448,605 | A | * | 9/1948 | Kleinicke | 106/223 |
| 4,087,572 | A | * | 5/1978 | Nimerick | 427/214 |
| 4,695,322 | A | * | 9/1987 | Schwabe et al. | 106/35 |
| 5,559,166 | A | * | 9/1996 | Bearden | 523/132 |

FOREIGN PATENT DOCUMENTS

| EP | 466514 A2 | * | 1/1992 |
| WO | WO 9823705 A1 | * | 6/1998 |

* cited by examiner

*Primary Examiner*—Timothy Meeks
*Assistant Examiner*—Eric B. Fuller
(74) *Attorney, Agent, or Firm*—Brouse McDowell; John M. Skeriotis; Daniel A. Thomson

(57) ABSTRACT

A heterogeneous mixture produced by blending aliphatic or cyclic organic compounds with carboxylic acids of chemical structure R—COOH and applied to soils in a manner to produce high levels of dust and erosion control, and soil stabilization. Alternatively, a heterogeneous mixture may be produced by blending aliphatic or cyclic organic compounds with polyolefins of chemical structure $C_nH_{2n}$ or R—$C_{2n}H_{3n}$, and applied to soils in a manner to produce high levels of dust control and soil stabilization. The aliphatic and cyclic compounds act as plasticizers and carriers for the carboxylic acids or polyolefin compounds. When applied to soil the carrier provides a mechanism for the carboxylic acid or polyolefin to penetrate the soil and also acts as a dust suppressing weighting agent. The plasticized carboxylic acid and/or polyolefin provides a durable, reworkable binder that associates small particulates while stabilizing soil and aggregate.

16 Claims, 3 Drawing Sheets

METHOD OF CHEMICAL SOIL STABILIZATION AND DUST CONTROL

CROSS-REFERENCE TO RELATED APPLICATIONS

This application is a continuation of U.S. patent application Ser. No. 09/896,456, filed on Jun. 29, 2001, now abandoned which is a continuation-in-pan application of U.S. patent Ser. No. 09/606,497, filed Jun. 29, 2000, now abandoned.

BACKGROUND OF THE INVENTION

1. Technical Field

This invention relates to a method of soil stabilization and dust control utilizing aliphatic and cyclic organic compounds, specifically blends of resin acids, fatty acids and their esters with solvents that act as plasticizers and carriers.

2. Background of Invention

Many methods of chemical dust and erosion control, and soil stabilization have been utilized over the years, with various detrimental effects on environment, health, and safety and varying degrees of success. Traditional products used for dust control and soil stabilization consist of used or recycled oil, virgin oils, chlorides, lignins, and emulsifications made with low-grade petroleum resins, asphalt, oil, and pitch.

The use of used or recycled petroleum oils has long been employed as a dust control agent. In recent years legislation by most states has curtailed the use of these oils for dust control because of concerns with environment, health, and safety. This legislation has spawned an interest in virgin oils, some highly refined and very safe. The highly refined products may contain low or no aromatics but are generally cost prohibitive for most applications. In addition, petroleum oils have limited value as dust suppressants and virtually no value as soil stabilizers. They act as particle weighting agents by the processes of adsorption or absorption and do not have any significant cohesive action for soil stabilization and control of fine dust.

Magnesium chloride, calcium chloride, and sodium chloride used in solution or solid form act as humectants when added to soil. These products work well in areas of sufficient moisture or require watering for humectants action. The problems with these products are their solubility in water and effects on ground water and plant life. In addition, as strong electrolytes they are highly corrosive to metal equipment.

Lignins have been employed as a low-cost means of dust control for several decades. Recently lignins have come under considerable attack by environmental, health, and safety organizations that have identified dioxin and dioxin forming compounds in lignin. This problem is compounded by lignins solubility in water and it's ability to contaminate ground water. Lignins also have a limited working life because they are water soluble they tend to be washed away with rain, melting snow, or other moisture.

Many types of emulsions of tall oil, petroleum resins, and asphalts and combinations can be prepared and have been exhibited in prior art. Typically these products are emulsified to reduce viscosity to sprayable levels and to aid in penetration of the product into the soil. One of the problems created is the use of excess liquid, which is sprayed onto the ground and can migrate into ground water. In addition, emulsions can also be severely damaged by rain and moisture when the moisture event occurs prior to the emulsion breaking and the active ingredients curing. When cured properly these products produce a bound soil layer, which is effective for dust control for short periods and under conditions where there is little mechanical disturbance. Examples of tall oil pitch emulsions that produce these results can be found in prior art. Doyle U.S. Pat. No. 5,895,347 discloses chemically stabilized emulsions of tall oil pitch, hydrochloric and stearic acids, and emulsifiers in water where temperature and pH are controlled during preparation. Additionally, Burch U.S. Pat. No. 4,822,425 discloses an emulsion comprising tall oil pitch, rosin, emulsifier, and water.

SUMMARY OF THE INVENTION

Accordingly, several objects and advantages of our invention are superior dust control and soil stabilization in areas of intense use. Improved air and water quality through reduction of airborne particulates and soil erosion are achieved with use of our chemical agents formulated from safe aliphatic and cyclic organic compounds.

In addition, our invention has several benefits over traditional chemical dust and erosion control, and soil stabilization agents, it can be applied neat or undiluted eliminating the chances of collateral runoff, it remains active over long periods of time requiring fewer maintenance applications, is insoluble in water resisting rain and inclement weather contains no electrolytes thus inhibits corrosion.

A heterogeneous mixture produced by blending aliphatic or cyclic organic compounds with carboxylic acids of chemical structure R—COOH and applied to soils in a manner to produce high levels of dust control and soil stabilization. The aliphatic and cyclic compounds act as plasticizers and carriers for the carboxylic acids. When applied to soil the carrier provides a mechanism for the carboxylic acid to penetrate the soil and also acts as a dust suppressing weighting agent. The plasticized carboxylic acid provides a durable, reworkable binder that associates small particulates while stabilizing soil and aggregate. The chemical agent is manufactured and applied using conventional mixing and applied using conventional construction equipment. A test performed at a continuous caster area in a steel mill produced 176% improvement in soil stiffness and modulus as well demonstrable improvements in dust control. Untreated test locations are shown in FIG. 1, untreated (7.3 MN/m) (01), untreated (10.8 MN/m) (02), untreated (9.9 MN/m) (03), untreated (7.6 MN/m) (04). Treated test locations are shown in FIG. 1, treated (17.4 MN/m) (05), treated (21.1 MN/m) (06), treated (18.4 MN/m) (07), treated (31.2 MN/m) (08), treated (37.2 MN/m) (09), and treated (22.2 MN/m) (10).

The present invention also encompasses a heterogeneous mixture produced by blending aliphatic or cyclic organic compounds with polyolefins of chemical structure $C_nH_{2n}$ or R—$C_{2n}H_{3n}$, and applied to soils in a manner to produce high levels of dust control and soil stabilization. The aliphatic and cyclic compounds act as plasticizers and carriers for the polyolefin to penetrate the soil and also acts as a dust suppressing weighting agent. The plasticized polyolefin provides a durable, reworkable binder that associates small particulates while stabilizing soil and aggregate. The chemical agent is manufactured and applied using conventional mixing and applied using conventional construction equipment. A laboratory test performed on compacted gravel produced 117% improvement in soil stiffness and modulus as well as demonstrable improvements in dust control.

Still further objects and advantages will become apparent from a consideration of the ensuing description and accompanying drawings.

BRIEF DESCRIPTION OF THE DRAWINGS

The preferred embodiment of the invention, illustrative of the best mode in which applicant contemplated applying the principles of the invention, is set forth in the following description and is shown in the drawings and is particularly and distinctly pointed out and set forth in the appended claims.

DESCRIPTION OF THE PREFERRED EMBODIMENTS

Description of First Embodiment

Figure 1:
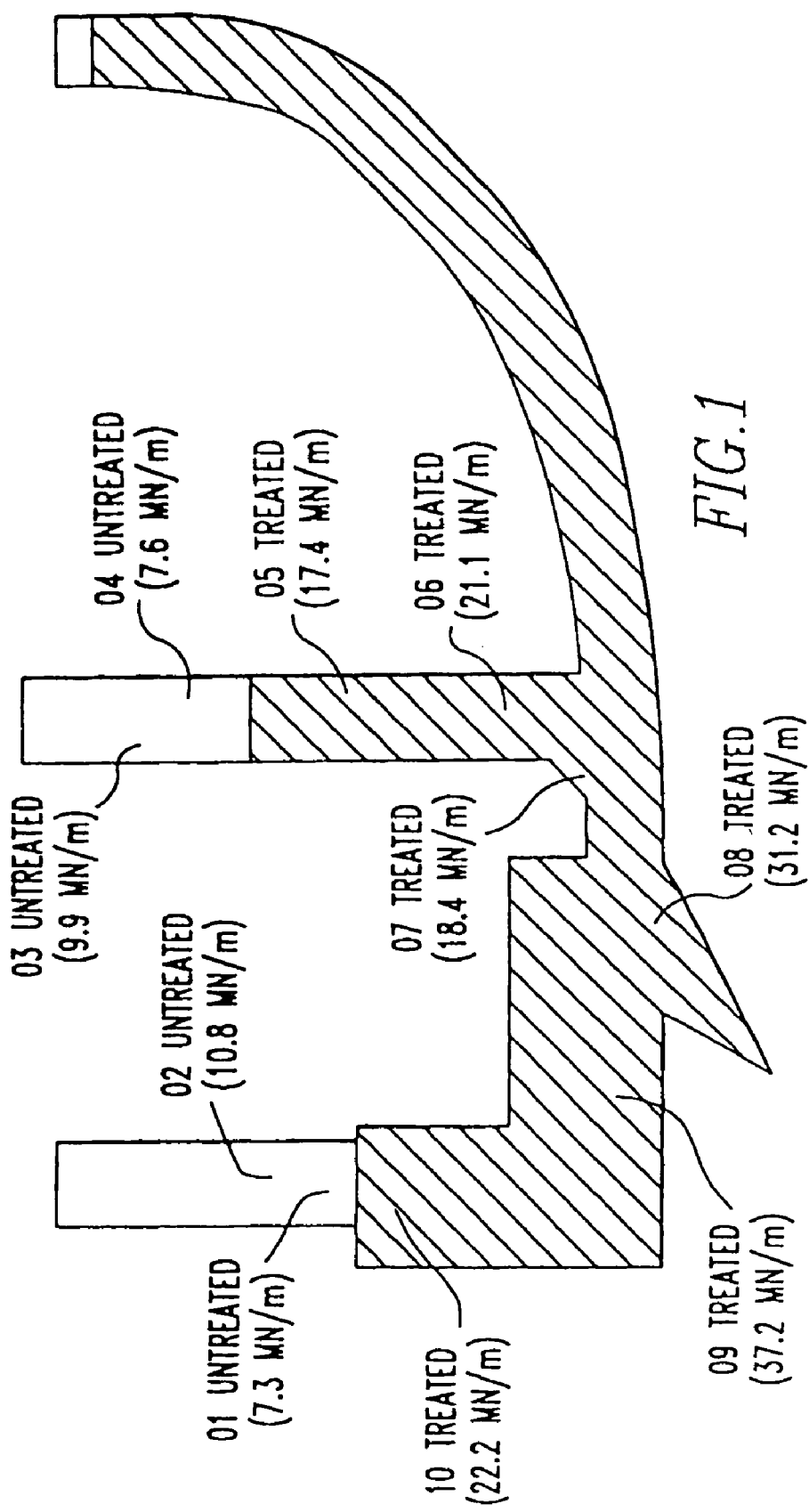
FIG. 1 is a top view of a test plot from an application of a preferred embodiment of the present invention to stabilize soil and control dust at a steel mill.
Figure 2:
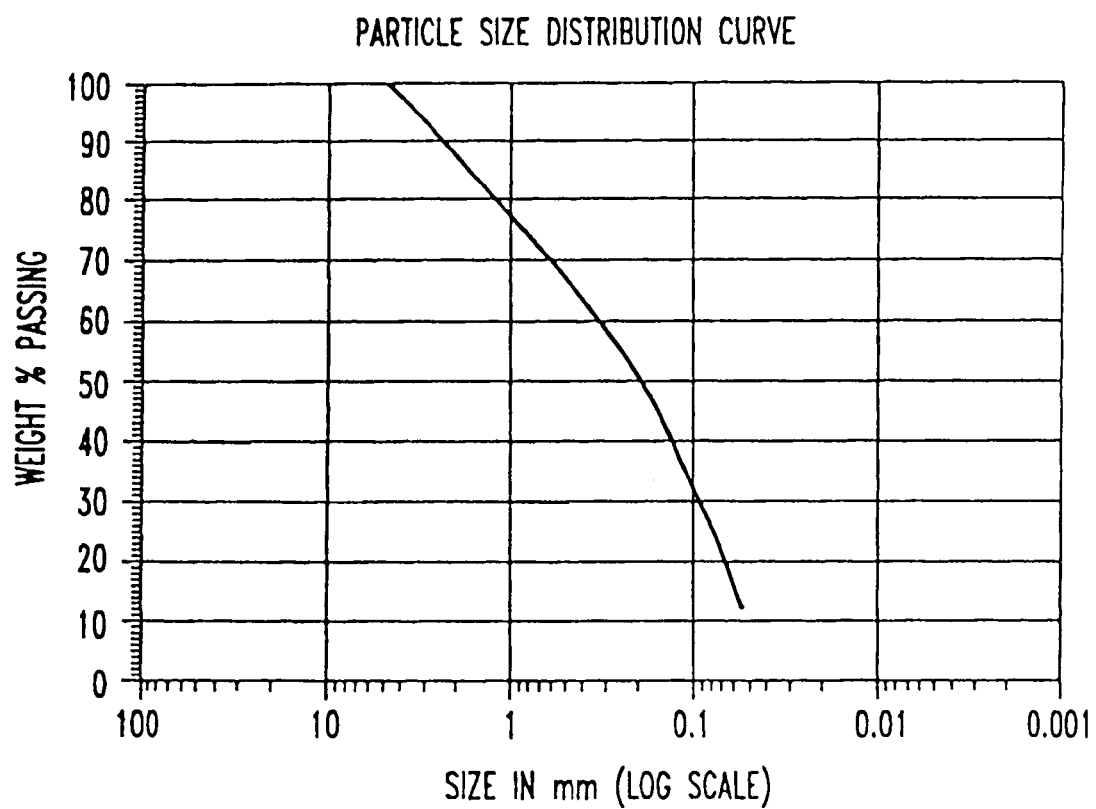
FIG. 2 is a particle size distribution curve from a test conducted according to a preferred method of this invention.

The invention described herein consists of aliphatic and cyclic organic compounds utilized as plasticizers and carriers that are blended with materials composed primarily of carboxylic acids and applied in a manner to produce improved levels of dust and erosion control, and soil stabilization.

A novel and unexpected result occurs when carboxylic acids are blended with aliphatic or cyclic organic plasticizers and carriers. These blends are processed into either heterogeneous mixtures or emulsions that applied to soil, aggregate, or mineral provide high levels of long lasting dust control and stabilization. The invention exhibits tremendous moisture resistance, reworkability, working life, while being noncorrosive and nonhazardous.

Aliphatic organic compounds refers to saturated and unsaturated hydrocarbons derived from petroleum, coal, or synthetic manufacturing including paraffins or alkanes, olefins, alkenes, and alkadienes. Alcohols, ethers, aldehydes, ketones, carboxylic acids, and carbohydrates. The invention is comprised 0–95% by weight of these compounds.

Cyclic organic compounds refer to alicyclic hydrocarbons, cycloparaffins, cycloolefins, cycloacetylenes, aromatic hydrocarbons, heterocyclics, and any combinations of aliphatic and cyclic structures such as terpenes, amino acids, proteins and nucleic acids. The invention is comprised 0–95% by weight of these compounds.

Carboxylic acid refers to any substance whose major constituents are saturated or unsaturated fatty acids and their esters derived from animal or vegetable fat or oil; and vegetable derived resins or rosin acids, all represented chemically R—COOH. The invention is comprised 5–70% by weight of these substances.

Plasticizer refers to organic compounds added to carboxylic acids to facilitate processing and increase the flexibility and durability of the final product.

Carrier refers to any organic compounds in which carboxylic acids are miscible in and serve as a vehicle to aid in the dispersion and penetration of plasticized carboxylic acids into the soil.

Heterogeneous mixtures refer to mixtures or solutions comprised of two or more substances, whether or not they are uniformly dispersed.

Emulsions refer to mixtures of two or more immiscible liquids held in suspension by small percentages of emulsifiers. Emulsifiers can be protein or carbohydrate polymers or long-chained alcohols and fatty acids. The emulsions can either be oil-in-water or water-in-oil continuous phase mixtures.

Operation of First Embodiment

The invention is manufactured using conventional manufacturing equipment. Conventional mixers, emulsifiers, or colloid mills are utilized to blend these components into stable heterogeneous mixers or emulsions.

Application of the chemical agent to the soil is also accomplished by the use of conventional spray equipment. The agent is gravity fed or pumped through hoses, spray nozzles, or fixed sprayers and evenly applied to the soil or material to be treated. Motor-graders, asphalt grinders, mixers, pug mills, compactors, rollers, and other conventional construction equipment may be utilized to blend, set grade, and compact stabilized base if desired.

Once applied the liquid penetrates into the soil where two mechanisms for dust control and stabilization contribute to the effect. The first is a particle weighting and loading mechanism achieved through the processes of adsorption, adherence of molecules to the surface of particles and absorption, penetration of the substance into the inner structure of the particles.

The second mechanism is produced by the plasticized higher polymeric carboxylic acids which act as binders. The fatty acids and resins bind particles into a tightly cohesive base when subjected to compactive forces. The plasticized fatty acids and resins remain active even through severe wet weather and mechanical disturbances from heavy tracked vehicles and steel-chained tires. Our invention displays a unique and unexpected ability to be recompacted into a tightly cohesive base when disturbed, dramatically extending the working life of the chemical agents.

Examples of First Embodiment

EXAMPLE 1

This example discloses a formulation for producing a heterogeneous mixture depicted in our invention.

| Constituent | Trade Name | Manufacturer | Weight % |
| --- | --- | --- | --- |
| 1. Severely hydrotreated paraffinic hydrocarbons | 50 Neutral HT | Petro-Canada | 39% |
| 2. Synthetic iso-alkanes | DSF-65 | Petro-Canada | 33% |
| 3. Mixture of long chain and tricyclic organic acids and esters of sterols and fatty acids | Tallex | Westvaco Chemical | 28% |

The Tallex material is maintained at 45–135 degrees centigrade and blended into the remaining materials using conventional blending equipment or agitation.

EXAMPLE 2

This example discloses a formulation for producing an emulsion,

| Constituent | Trade Name | Manufacturer | Weight % |
|---|---|---|---|
| 1. Severely hydrotreated paraffinic hydrocarbons | 50 Neutral HT | Petro-Canada | 16% |
| 2. Synthetic iso-alkanes | DSF-65 | Petro-Canada | 13% |
| 3. Mixture of long chain and tricyclic organic acids and esters of sterols and fatty acids | Tallex | Westvaco Chemical | 11% |
| 4. Water | | | 48% |
| 5. lignosulfonate | Indulin SAL | Westvaco Chemical | 10% |
| 6. polyoxypropylene | Pluronic F68 | BASF | 2% |

The Tallex material is maintained at 45–135 degrees centigrade and blended into the remaining materials using conventional high shear mixers, mixer/emulsifiers, colloid mill, or other suitable mixing equipment.

Test of First Embodiment

A 5,000 square meter test plot was prepared to test the effectiveness of the invention as a dust control agent and soil stabilizer. A severe test in an intensely utilized area was required. A slag reclamation area in the continuous caster process of a large Cleveland, Ohio steel mill was chosen for the test. The plot selected operates 24 hours/day, 5–7 days/week and averages over 100 vehicle passes per day with the majority of vehicles large pot haulers, front-end loaders with steel-chained tires, and tractor-trailers.

Various treatments had been utilized in this area in the past including watering, chlorides, and asphalt emulsions with limited success. Applications of these chemical agents were typically 1–2 times daily for dust control. Historical applications rates for 60% solids asphalt emulsions ranged between 0.15–0.40 liters/square meter daily.

Initial observations of the surface prior to testing revealed a slag covered road comprised of material resembling moon dust. A particle size analysis performed on the material per ASTM C136 indicated the material consisted of 25% silt and clay, 62% sand, and 13% gravel. Graph 1 below shows the particle size distribution curve for the material tested.

The test plot was treated with the material disclosed in Example 1 over a six-week period. Three applications over the six week period were made using a conventional spray truck with a computerized spray output at an application rate of 0.39 liters/square meter each application.

Examination of the area indicated our invention provided a higher level of dust control using less than 25% of the volume of active product previously required. In addition to visual observations, soil stiffness and modulus readings were made using a Midwest Industrial Supply, Inc. Stiffness and Modulus Instrument (SAMITRON). The SAMITRON measures in-situ soil stiffness by measuring the stress imparted to the surface and the resulting surface velocity as a function of time. If a Poisson's ratio is assumed and knowing the SAMITRON's physical dimensions, shear and Young's Modulus can be expressed:

$$\text{Young's Modulus } (E) = \frac{(\text{Stiffness})(1 - \text{Poisson's Ratio}^2)}{0.1011555}$$

where Poisson's Ratio = 0.35

Six measurements were made at treated locations within the test plot with four untreated measurements made just outside the test plot to provide control data. The untreated locations outside the test plot were selected in the same general vehicle path to assume equivalent traffic conditions. The average of three readings was reported from each site with a 176% increase in stiffness and modulus when compared to the untreated locations. The averaged data with locations and drawing references are listed below:

| DRAWING REFERENCE | STIFFNESS (MN/m) | MODULUS (Mpa) |
|---|---|---|
| Untreated 01 | 7.3 | 63.7 |
| Untreated 02 | 10.8 | 93.6 |
| Untreated 03 | 9.9 | 86.0 |
| Untreated 04 | 7.6 | 65.7 |
| Treated 05 | 17.4 | 151.1 |
| Treated 06 | 21.1 | 182.9 |
| Treated 07 | 18.4 | 159.3 |
| Treated 08 | 31.2 | 270.4 |
| Treated 09 | 37.2 | 323.1 |
| Treated 10 | 22.2 | 192.8 |

Description of Second Embodiment

The invention described herein consists of aliphatic and cyclic organic compounds utilized as plasticizers and carriers that are blended with materials composed primarily of thermoplastic polyolefin compounds and applied in a manner to produce improved levels of dust and erosion control, and soil stabilization.

A novel and unexpected result occurs when polyolefin compounds are blended with aliphatic or cyclic organic plasticizers and carriers. These blends are processed into either heterogeneous mixtures or emulsions that applied to soil, aggregate, or mineral provide high levels of long lasting dust control and stabilization. The invention exhibits tremendous moisture resistance, reworkability, working life, while being noncorrosive and nonhazardous.

Aliphatic organic compounds refers to saturated and unsaturated hydrocarbons derived from petroleum, coal, or synthetic manufacturing including paraffins or alkanes, olefins, alkenes, and alkadienes. Alcohols, ethers, aldehydes, ketones, carboxylic acids, and carbohydrates. The invention is comprised 0–95% by weight of these compounds.

Cyclic organic compounds refer to alicyclic hydrocarbons, cycloparaffins, cycloolefins, cycloacetylenes, aromatic hydrocarbons, heterocyclics, and any combinations of aliphatic and cyclic structures such as terpenes, amino acids, proteins and nucleic acids. The invention is comprised 0–95% by weight of these compounds.

Thermoplastic polyolefin compound refers to any substance derived from olefins with chemical structure $C_nH_{2n}$ or $R-C_{2n}H_{3n}$, including polyethylene, polypropylene, polybutenes, polyisobutylenes, polyisoprene, and their copolymers. The invention is comprised of 2–90% by weight of these substances.

Plasticizer refers to organic compounds added to polyolefin compounds to facilitate processing and increase the flexibility and durability of the final product.

Carrier refers to any organic compounds in which polyolefin compounds are miscible in and serve as a vehicle to aid in the dispersion and penetration of plasticized polyolefin into the soil.

Heterogeneous mixtures refer to mixtures or solutions comprised of two or more substances, whether or not they are uniformly dispersed.

Emulsions refer to mixtures of two or more immiscible liquids held in suspension by small percentages of emulsifiers. Emulsifiers can be protein or carbohydrate polymers or long-chained alcohols and fatty acids. The emulsions can either be oil-in-water or water-in-oil continuous phase mixtures.

Operation of the Second Embodiment

The invention is manufactured using conventional manufacturing equipment. Conventional mixers, emulsifiers, or colloid mills are utilized to blend these components into stable heterogeneous mixers or emulsions.

Application of the chemical agent to the soil is also accomplished by the use of conventional spray equipment. The agent is gravity fed or pumped through hoses, spray nozzles, or fixed sprayers and evenly applied to the soil or material to be treated. Motor-graders, asphalt grinders, mixers, pug mills, compactors, rollers, and other conventional construction equipment may be utilized to blend, set grade, and compact stabilized base if desired.

Once applied, the liquid penetrates into the soil where two mechanisms for dust control and stabilization contribute to the effect. The first is a particle weighting and loading mechanism achieved through the processes of absorption, adherence of molecules to the surface of particles and absorption, penetration of the substance into the inner structure of the particles.

The second mechanism is produced by the plasticized higher polymeric polyolefin compounds which act as binders. The thermoplastic polyolefin compounds bind particles into a tightly cohesive base when subjected to compactive forces. The plasticized polyolefin compounds remain active even through severe wet weather and mechanical disturbances from heavy tracked vehicles and steel-chained tires. Our invention displays a unique and unexpected ability to be recompacted into a tightly cohesive base when disturbed, dramatically extending the working life of the chemical agents.

EXAMPLE 3

This example discloses a formulation for producing a heterogeneous mixture as disclosed in our invention.

| Constituent | Trade Name | Manufacturer | Weight % |
|---|---|---|---|
| 1. Synthetic iso-alkanes | DSF-65 | Petro-Canada | 67% |
| 2. Polyisobutylene | TPC 195 | Texas Petro-Chemical | 33% |

The TPC 195 material is maintained at 45–135 degrees centigrade and blended into the remaining materials using conventional blending equipment or agitation.

EXAMPLE 4

This example discloses a formulation for producing an emulsion.

| Constituent | Trade Name | Manufacturer | Weight % |
|---|---|---|---|
| 1. Synthetic iso-alkanes | DSF-65 | Petro-Canada | 15% |
| 2. Polyolefin | TPC 195 | Texas Petro-Chemical | 15% |
| 3. Water | | | 58% |
| 4. Low hydrophile-lipophile balance surfactant | NP 1.5 | Chemax | 5% |
| 5. High hydrophile-lipophile balance surfactant | Neodal R-91-8 | Tomah | 7% |

The TPC 195 material is maintained at 45–135 degrees centigrade and blended into the remaining materials using conventional high shear mixers, mixer/emulsifiers, colloid mill, or other suitable mixing equipment.

Test of Second Embodiment

Molded samples were constructed using standard CBR (California Bearing Ratio) molds using gravel taken from an aircraft runway from the Northwest Territories in Canada. Three control samples were made and compacted without the use of a stabilizing agent and tested. Alternatively, three samples were prepared using the material prepared as specified in Example 1 above.

Figure 3:
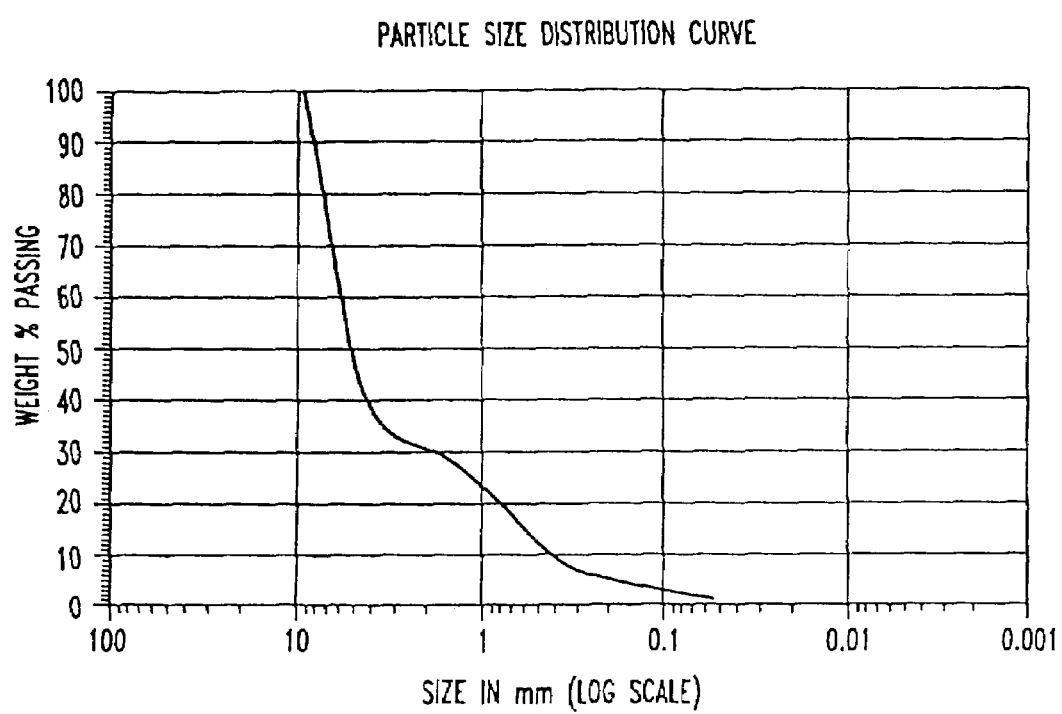
FIG. 3 is a particle size distribution curve from a test conducted according to an alternate preferred method of this invention.

A particle size analysis performed on the material per ASTM C136 indicated the material consisted of 3% silt and clay, 29% sand, and 68% gravel. FIG. 3 shows the particle size distribution curve for the material tested.

The control samples test mold were prepared by compacting 10 kilograms of gravel into the standard 15.24 centimeter diameter CBR molds using an automatic compactor in three lifts and 56 blows per lift. The treated samples were constructed in the same manor with the addition of 100 cubic centimeters of soil stabilizer prepared as described in Example 1.

Soil stiffness and modulus readings were made using a Midwest Industrial Supply, Inc. Stiffness and Modulus Instrument (SAMITRON). The SAMITRON measures in-situ soil stiffness by measuring the stress imparted to the surface and the resulting surface velocity as a function of time. If a Poisson's ratio is assumed and knowing the SAMITRON's physical dimensions, shear and Young's Modulus can be expressed:

$$\text{Young's Modulus } (E) = \frac{(\text{Stiffness})(1 - \text{Poisson's Ratio}^2)}{0.1011555}$$

where Poisson's Ratio = 0.35

An average was taken from three measurements made on each sample. The average of three readings was reported from each sample with a 117% increase in stiffness and modulus when compared to the untreated locations. The averaged data is listed below:

| DRAWING REFERENCE | STIFFNESS (MN/m) | MODULUS (Mpa) |
|---|---|---|
| Untreated 01 | 5.6 | 48.6 |
| Untreated 02 | 6.1 | 52.9 |
| Untreated 03 | 5.8 | 50.3 |
| Treated 04 | 12.7 | 110.2 |
| Treated 05 | 12.6 | 109.3 |
| Treated 06 | 12.7 | 110.2 |

Accordingly, it can be seen that we have provided a unique and effective means of dust control and stabilization using a chemical agent that provided unexpected results when tested.

Although the description above contains much specificity, these should not be construed as limiting the scope of the invention but as merely providing illustrations of some of the presently preferred embodiments of this invention. Various other embodiments and ramifications are possible within it's scope. For example, several different types of substances rich in polyolefins are available as drop-in replacements to those tested, as well as numerous a aliphatic and cyclic organic compounds. The invention given as a method of soil stabilization and dust control also has related applications as a soil remediation agent, recycled asphalt stabilizer, and asphalt rejuvenator, and coal based or other synthetic fuel additives.

Thus the scope of the invention should be determined by the appended claims and their legal equivalents, rather than by the examples given.

What is claimed is:

1. A method for providing at least one of stabilization and dust control to a particulate surface soil, the method comprising:
   applying to and allowing to penetrate the surface soil a composition consisting essentially of:
   (a) a binder consisting essentially of a carboxylic acid, an ester, or a thermoplastic polyolefin; and,
   (b) a synthetic isoalkane.

2. The method of claim 1, where the composition is devoid of electrolytes.

3. The method of claim 1, where said composition is applied neat to the surface soil.

4. The method of claim 1, where the binder is a thermoplastic polyolefin.

5. The method of claim 4, where the composition comprises from 2 to 90% by weight of the thermoplastic polyolefin.

6. The method of claim 1, where the binder is a carboxylic acid.

7. The method of claim 6, where the carboxylic acid is a fatty acid.

8. The method of claim 6, where the composition comprises from 5 to 70% by weight of the carboxylic acid.

9. A method for providing at least one of stabilization and dust control to a particulate surface soil, the method comprising the step of:
   applying to and allowing to penetrate the surface soil a composition consisting essentially of:
   (a) a binder consisting essentially of a carboxylic acid, an ester, or a thermoplastic polyolefin;
   (b) a synthetic isoalkane; and,
   (c) an emulsifier.

10. A process for at least one of reducing erosion and controlling dust in surface soil, the process comprising:
    (a) applying to said surface soil a composition comprising two organic materials and allowing the composition to penetrate and weight discrete portions of the surface soil, where the composition consists essentially of (a) a binder consisting essentially of a carboxylic acid, an ester, or a thermoplastic polyolefin and (b) a plasticizer consisting essentially of a synthetic isoalkane; and
    allowing at least one material in the composition to form a binder in which portions of the surface soil are associated, so as to provide a treated surface soil.

11. The process of claim 10, where said surface soil comprises at least one of dirt, slag, sand, gravel, mineral, and aggregate.

12. The process of claim 10, where said weighting is achieved by at least one of adsorption and absorption of said blend to said discrete portions of said surface soil.

13. The process of claim 10, where said surface soil exhibits at least a 100% increase in stiffness and Young's modulus after being treated.

14. The process of claim 10, where the composition comprises 2 to 90% by weight of the polyolefin.

15. A process for at least one of reducing erosion and controlling dust in surface soil, the process comprising:
    (a) applying to said surface soil a composition and allowing the composition to penetrate and weight discrete portions of the surface soil, where the composition consists essentially of (a) a binder consisting essentially of a carboxylic acid, an ester, or a thermoplastic polyolefin (b) a plasticizer consisting essentially of a synthetic isoalkane and (c) a long chain carboxylic acid or ester; and,
    (b) allowing at least one material in the composition to form a binder in which portions of the surface soil are associated, so as to provide a treated surface soil.

16. The process of claim 15, where the composition comprises from 5 to 70% by weight of the carboxylic acid or ester.

* * * * *